United States Patent
Lee et al.

[11] Patent Number: 5,718,971
[45] Date of Patent: Feb. 17, 1998

[54] POLYESTER FILM COMPRISING ALUMINA AND SILANE COUPLING AGENT

[75] Inventors: Kwang-Hyung Lee, Suwon-si; Gwan-Hyung Lee, Incheon; Young-Jin Lee, Anyang-si, all of Rep. of Korea

[73] Assignee: SKC Limited, Kyungki-do, Rep. of Korea

[21] Appl. No.: 576,656

[22] Filed: Dec. 21, 1995

[30] Foreign Application Priority Data

Dec. 22, 1994 [KR] Rep. of Korea ............ 94-35968
Dec. 22, 1994 [KR] Rep. of Korea ............ 94-35970

[51] Int. Cl.$^6$ ............................................. B32B 5/16
[52] U.S. Cl. .................. 428/329; 428/331; 428/332; 428/447; 428/480; 428/910
[58] Field of Search ................. 428/329, 332, 428/447, 910, 331, 480

[56] References Cited

U.S. PATENT DOCUMENTS

| | | | |
|---|---|---|---|
| 5,368,932 | 11/1994 | Murooka et al. | 428/327 |
| 5,429,855 | 7/1995 | Kotani et al. | 428/141 |
| 5,434,000 | 7/1995 | Konagaya et al. | 428/329 |
| 5,569,532 | 10/1996 | Lee et al. | 428/327 |
| 5,580,652 | 12/1996 | Lee et al. | 428/328 |

*Primary Examiner*—H. Thi Le
*Attorney, Agent, or Firm*—Anderson, Kill & Olick

[57] ABSTRACT

A biaxially oriented polyester film comprises: 0.01 to 4 wt % of γ, δ- θ-alumina or a mixture thereof having an average particle diameter ranging from 0.005 to 3 μm and a Mohs hardness of 6 or more; 0.05 to 5 wt %, based on the amount of the alumina employed, of a silane coupling agent of the following formula (I); and, optionally, 0.01 to 4 wt % of spherical silica particle having an average particle diameter ranging from 0.005 to 3 μm:

$$R_1—R_2—Si—(OR_3)_3 \quad (I)$$

wherein, $R_1$ is a methacryl, an acryl, a glycidyl or an amino group;
$R_2$ is a $C_{1-5}$ alkylene group; and
$R_3$ is a $C_{1-3}$ alkyl group.

The film has improved transparency as well as surface properties, and is especially useful as labels, window coating films, photoresists and the like.

5 Claims, No Drawings

POLYESTER FILM COMPRISING ALUMINA AND SILANE COUPLING AGENT

FIELD OF THE INVENTION

The present invention relates to a biaxially oriented polyester film having improved surface properties and transparency, which contains alumina, a silane coupling agent and, optionally, spherical silica.

BACKGROUND OF THE INVENTION

Polyesters such as polyethylene terephthalate (PET) are known to possess good chemical stability, physical and mechanical strength, heat resistance, durability, chemical resistance, weather resistance and electrical insulation property; and, therefore, have been widely used in manufacturing various articles including medical devices, capacitors, photographic films, packaging and labelling materials, and magnetic recording media.

In general, it is well known that the slip property and abrasion resistance of a polyester film greatly influences the preparation process, runnability and quality of the film. In order to impart good runnability, processability and surface properties to the polyester film, such inorganic slip agents as calcium carbonate, silica, alumina and kaolin have been often incorporated into the polyester film to form minute protuberances on the surface of the film.

Although such inorganic slip agents are effective in controlling the surface properties of the film, however, they tend to deteriorate the transparency of the polyester film. Accordingly, the film containing such inorganic slip agents is not suitable for purpose of labeling, solar controlling, glass protecting, photoresisting and the like.

As an attempt to improve the transparency of the polyester film, therefore, Japanese Patent Laid-open Publication No. 298538/1992 discloses a polyester film comprising 0.001 to 5 wt % of silica having an average particle size ranging from 0.1 to 5 μm wherein the silica contains 1 to 30 silanol groups/nm² and 30 to 70% of the silanol groups is treated with a silane coupling agent. However, this method has the disadvantage of requiring a multi-step process including the steps of preparing treating the silica with a coupling agent in an aqueous system; filtering the treated silica particles; drying the filtered particles; and finally dispersing the dry particles in ethylene glycol to obtain an ethylene glycol slurry of the treated silica particles to be used in a subsequent polymerization reaction step.

Obviously, an in situ method of preparing the ethylene glycol slurry of the treated silica by way of treating silica with a coupling agent directly in ethylene glycol will be much more desirable than the method disclosed in the cited art. However, a polyester film comprising treated silica particles obtained by such direct in situ method exhibits inferior performance characteristics, as can be seen from the results of Comparative Example 7, given below.

Accordingly, the present inventors have endeavored to find an in situ method of directly preparing a glycol slurry of surface treated inorganic particles suitable for use in the production of a polyester film having improved surface properties and transparency.

SUMMARY OF THE INVENTION

It is, therefore, a primary object of the present invention to provide a biaxially oriented polyester film having a high transparency as well as improved surface properties, by way of treating alumina with a silane coupling agent in situ in a glycol to obtain a glycol slurry of treated alumina and directly using the slurry, optionally containing spherical silica, in subsequent transesterification and polycondensation reactions.

In accordance with the present invention, there is provided a biaxially oriented polyester film comprising 0.01 to 4 wt % of γ-, δ-, θ-alumina or a mixture thereof having an average particle diameter ranging from 0.005 to 3 μm and a Mohs hardness of 6 or more, and 0.05 to 5 wt %, based on the amount of alumina, of a silane coupling agent of formula (I):

$$R_1-R_2-Si-(OR_3)_3 \qquad (I)$$

wherein, $R_1$ is an organic functional group such as

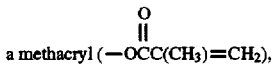
a methacryl $(-OCC(CH_3)=CH_2)$,

an acryl $(-OCCH=CH_2)$,

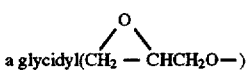
a glycidyl $(CH_2-CHCH_2O-)$ or an amino $(-NR'_2)$ group with R' being a hydrogen or an alkyl radical;

$R_2$ is a $C_{1-5}$ alkylene group; and $R_3$ is a $C_{1-3}$ alkyl group.

DETAILED DESCRIPTION OF THE INVENTION

A polyester resin which may be used to prepare the polyester film of the present invention is produced by a process which comprises transesterifying and polycondensing a dialkyl ester of an aromatic dicarboxylic acid and an aliphatic glycol.

The transesterification and polycondensation reactions may be carried out using batch or continuous processes, while a direct, one-step polymerization may also be used for the preparation of the polyester resin.

Representatives dialkyl esters of aromatic dicarboxylic acids which may be used in preparing a polyester resin in accordance with the present invention include: dialkyl esters of terephthalic acid, isophthalic acid, naphthalene dicarboxylic acid, cyclohexane dicarboxylic acid, diphenoxyethane dicarboxylic acid, diphenyl dicarboxylic acid, diphenyl ether dicarboxylic acid, anthracene dicarboxylic acid and α,β-bis(2-chlorophenoxy)ethane-4,4'-dicarboxylic acid, and others. Among them, dimethyl terephthalate and dimethyl-2,6-naphthalate are most preferred.

Exemplary aliphatic glycols which may be used in the present invention include: ethylene glycol, trimethylene glycol, tetramethylene glycol, pentamethylene glycol, hexamethylene glycol and hexylene glycol, and others. Among them, ethylene glycol is most preferred.

The polyester which may be preferably used in the present invention is polyethylene terephthalate(PET) obtained from dimethyl terephthalate and ethylene glycol by using any of the conventional transesterification and polycondensation methods well known in the art.

A preferred polyester for use in the present invention includes 80 mole % of ethylene terephthalate repeating units and 20 mole % of copolymeric repeating units derived from other dicarboxylic acids or oxycarboxylic acids as well as other diols. Such dicarboxylic acids and oxycarboxylic acids include: isophthalic acid, p-β-hydroxyethoxy benzoic acid, diphenyl dicarboxylic acid, 4,4'-dicarboxylbenzophenone, bis(4-carboxyldiphenyl)ethane, adipic acid, sebacic acid, sodium 3,5-di(hydroxycarbonyl)benzene sulfonate, p-oxybenzoic acid and the like; and said other diols include: neopentyl glycol, diethylene glycol, cyclohexane dimethanol and the like.

The transesterification catalyst which can be used in the present invention may be any one conventionally used in the art such as sodium, manganese, potassium, lithium, calcium, magnesium, barium, zinc, zirconium, cobalt, aluminum and cadmium compounds, and a mixture thereof.

The polycondensation catalyst which can be used in the present invention may be any one conventionally used in the art such as titanium, germanium, tin, antimony, zinc, cobalt, aluminum, lead, manganese and calcium compounds, and a mixture thereof.

$\gamma$-, $\delta$-, $\theta$-alumina or a mixture thereof, which is used as a slip agent in the present invention, is added during the preparation of the polyester, preferably during the transesterification step or immediately prior to the polycondensation step. The alumina has an average particle diameter ranging from 0.005 to 3 μm, preferably from 0.01 to 1.5 μm and a Mobs hardness of 6 or more; and may be employed in an amount ranging from 0.01 to 4 wt %, preferably from 0.05 to 2 wt % based on the weight of the polyester.

The silane coupling agent, which is used for the treatment of the alumina in the present film, has a structure of formula (I):

wherein, $R_1$ is an organic functional group such as

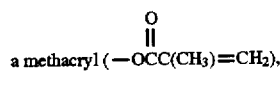
a methacryl ($-OCC(CH_3)=CH_2$),

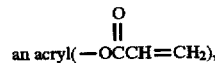
an acryl($-OCCH=CH_2$),

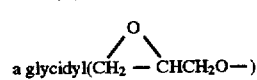
a glycidyl($CH_2 - CHCH_2O-$)

or an amino ($-NR'_2$) group with R' being a hydrogen or an alkyl radical;

$R_2$ is a $C_{1-5}$ alkylene group; and $R_3$ is a $C_{1-3}$ alkyl group.

The silane coupling agent preferred in the present invention is the compound of the formula(I) wherein $R_2$ is a propylene group and $R_3$ is a methyl or ethyl group.

In the present invention, the silane coupling agent may be added to, an ethylene glycol slurry containing 20 to 60 wt %, more preferably 25 to 55 wt % of alumina, in an amount ranging from 0.05 to 5 wt %, preferably from 0.1 to 5 wt % based on the weight of the alumina employed. The silane coupling agent may be preferably added to the ethylene glycol slurry, while stirring, at a temperature ranging from 30° to 160° C., preferably 30° to 120° C., and the resulting mixture is preferably maintained for a period ranging from 40 to 80 minutes, more preferably 50 to 70 minutes to treat alumina with the silane coupling agent.

Spherical silica may be optionally added as another slip agent, together with alumina, in order to increase runnability. The spherical silica having an average particle diameter ranging from 0.1 to 1 μm, preferably from 0.15 to 0.7 μm, may be employed in the present invention in an amount from 0.01 to 4 wt % based on the weight of the polyester.

In addition to the additives described above, the polyester film of the present invention may also contain other common additives such as antioxidants, antistatic agents, heat stabilizers and dyes. Such additives may be added at any time during the preparation of the polyester, preferably during the transesterification step or immediately prior to the polycondensation step.

In accordance with the present invention, the polyester film may be prepared by employing a conventional method, for example, by melt-extruding a polyester resin of molecular weight of about 20,000 containing the above-described alumina, silane coupling agent and, optionally, spherical silica, as well as other suitable additives into a cast sheet through a T-die. This sheet is subsequently quenched on a cold roll; then biaxially drawn to produce a biaxially oriented polyester film. The drawing process may be conducted at a temperature ranging from 60° to 150° C.; and the draw ratio may range from 2.5 to 6.0 in either the longitudinal or transverse direction.

The thickness of the polyester film produced as described above may be controlled depending on the usage; and it is usually in the range from 2.0 to 200 μm.

The following Examples are intended to illustrate the present invention more specifically, without limiting the scope of the invention.

In the Examples, the properties of the polymer film were evaluated in accordance with the following methods.

1. Average Particle Diameter

The average particle diameter was measured as a volumetric average diameter of particles in an ethylene glycol slurry by employing a centrifugation type granulometer (SA-CP2, Shimadzu in Japan).

2. Viscosity

The viscosity was measured at a spindle speed of 60 rpm by employing B type viscometer (Brookfield in England) at room temperature.

3. Molecular Weight

The molecular weight of a polymer was measured by way of a molecular weight measuring apparatus (150° C., Waters in U.S.A.) by using m-cresol as a mobile phase at a flow rate of 1 ml/min. and at a column temperature of 100° C.

4. Surface Smoothness

The surface smoothness of a 30 mm×20 mm×15 μm polyester film sample was determined with a contact type surface roughness gauge (SURFCORDER SE-30D, Kosaka Institute in Japan).

Average Surface Roughness at Centerline ($R_a$)

The height of a line parallel to a mean line of a roughness curve, where the areas of both sides of the line become equal.

Highest Height at Centerline ($R_t$)

Distance from the highest point to the lowest point within the area measured.

5. Runnability

The runnability of a film was measured by running a ½ inch wide tape made by slitting the film at 20° C. and at a relative humidity of 60% using a tape running tester (TBT-300D, Yokohama System in Japan), and then calculating the initial running friction coefficient μk by using the following equation:

$$\mu k = 0.733 \log(T_{out}/T_{in})$$

wherein:

$T_{in}$ is a tension of the tape at the inlet of the tester; and
$T_{out}$ is a tension of the tape at the outlet of the tester.

<Runnability at a high speed>

The runnability of a film at a high speed was measured by rotating the guide pin either in the running in the reverse direction, setting the angle for winding the film at 180° and then measuring the running friction coefficient at a speed of 50 cm/sec and at a tension of 300 g.

The runnability at a high speed was classified on the basis of the following criteria:

⊚: μk≦0.10: excellent

○: 0.10<μk<0.20: good
Δ: μk=0.20: common
X: μk>0.20: poor

6. Transparency

The transmittance of a 5 cm×5 cm film sample was measured by employing a haze tester (L-211, Gardner Experiment Station(?) in U.S.A.), and the haze value was calculated by the following formula:

Haze value=the amount of light scattered/the amount of light injected

The transparency of the film was classified on the basis of the following criteria:

◎: haze value≦1.0: excellent
○: 1.0<haze value≦1.2: good
Δ: 1.2<haze value≦1.4: common
X: 1.4<haze value: poor

EXAMPLE 1

An ethylene glycol slurry containing 20 wt % of γ-alumina was prepared, and then the average particle size of γ-alumina was measured. The slurry was then heated to 60° C. and thereto was added $H_2N(CH_2)_3Si(OCH_2CH_3)_3$ as a coupling agent, in an amount of 0.3 wt % based on the amount of γ-alumina employed, to treat the surface of the γ-alumina for 55 minutes. The viscosity of the slurry thus obtained was measured.

Dimethyl terephthalate and ethylene glycol were mixed at a molar ratio of 1:2 and the resulting mixture was transesterified in the presence of zinc acetate, and thereto were added the ethylene glycol slurry obtained above in an amount required to produce a polyester resin containing 0.25 wt % of treated alumina, followed by a polycondensation step carried out at a temperature ranging from 250° to 285° C. in the presence of antimony trioxide to obtain a polyester resin having a molecular weight of approximately 20,000.

The polyester resin thus obtained was dried and melt-extruded to form a cast sheet. The sheet was stretched in a draw ratio of 3.0 in both longitudinal and transverse directions at 90° C. to provide a biaxially oriented polyester film having a thickness of 12 μm. The properties of the film were measured and the results are shown in Table I.

EXAMPLES 2 TO 10 AND COMPARATIVE EXAMPLES 1 to 9

The procedure of Example 1 was repeated except that the additives were varied as shown in Table I.

The results of the measurements are shown in Table I.

TABLE I

| | Additives | | | | | Physical properties of film | | | | |
|---|---|---|---|---|---|---|---|---|---|---|
| | Slip Agent | | | Coupling Agent | | Molecular | Surface Smoothness | | Runna- | Tran- |
| | Comp. | Aver. Par. Dia. μm | Amount wt % | Comp. | Vis.* cps | Weight Mn | $R_a$ μm | $R_t$ μm | bility | spar- ency |
| Ex. | | | | | | | | | | |
| 1 | γ | 0.20 | 0.15 | @ | 55 | 17,400 | 0.011 | 0.153 | ◎ | ◎ |
| 2 | δ | 0.20 | 0.20 | @@¹ | 54 | 18,200 | 0.011 | 0.149 | ◎ | ◎ |
| 3 | γ | 0.35 | 0.25 | @@² | 52 | 19,900 | 0.014 | 0.198 | ◎ | ◎ |
| 4 | δ | 0.35 | 0.14 | @@@ | 50 | 18,300 | 0.016 | 0.203 | ◎ | ◎ |
| 5 | θ | 0.35 | 0.25 | @ | 54 | 17,800 | 0.015 | 0.200 | ◎ | ◎ |
| 6 | S + γ | 0.50 + 0.20 | 0.03 + 0.15 | @ | 55 | 19,200 | 0.019 | 0.152 | ◎ | ◎ |
| 7 | S + δ | 0.50 + 0.20 | 0.03 + 0.20 | @@¹ | 54 | 18,900 | 0.019 | 0.163 | ◎ | ◎ |
| 8 | S + γ | 0.90 + 0.35 | 0.01 + 0.25 | @@² | 52 | 18,800 | 0.017 | 0.253 | ◎ | ◎ |
| 9 | S + δ | 0.90 + 0.35 | 0.01 + 0.14 | @@@ | 50 | 19,200 | 0.016 | 0.232 | ◎ | ◎ |
| 10 | S + θ | 0.90 + 0.35 | 0.01 + 0.25 | @ | 54 | 18,800 | 0.017 | 0.253 | ◎ | ◎ |
| Com. Ex. | | | | | | | | | | |
| 1 | C | 0.40 | 0.30 | — | — | 18,300 | 0.022 | 0.356 | X | X |
| 2 | C | 0.54 | 0.20 | — | — | 17,300 | 0.023 | 0.411 | X | X |
| 3 | C | 0.65 | 0.15 | — | — | 18,700 | 0.026 | 0.465 | X | X |
| 4 | s | 0.15 | 0.25 | — | — | 18,400 | 0.011 | 0.125 | X | Δ |
| 5 | s | 0.26 | 0.20 | — | — | 17,900 | 0.018 | 0.165 | X | Δ |
| 6 | s | 0.35 | 0.15 | — | — | 17,800 | 0.019 | 0.198 | X | Δ |
| 7 | s | 0.26 | 0.20 | @ | 410 | 18,300 | 0.014 | 0.153 | Δ | X |
| 8 | γ | 0.20 | 0.15 | — | 1500 | 18,600 | 0.013 | 0.167 | Δ | ○ |
| 9 | δ | 0.20 | 0.20 | — | 510 | 18,800 | 0.012 | 0.153 | ○ | ○ |
| 10 | θ | 0.35 | 0.25 | — | 245 | 18,700 | 0.015 | 0.212 | ○ | ○ |

[Footnote]
C: calcium carbonate
γ: γ-alumina, δ: δ-alumina, θ: θ-alumina
S: spherical silica, s: silica
*: The solid content of the slurry was 20 wt %.
$R_a$: Average surface roughness at centerline
$R_t$: Highest height at centerline
@: $H_2N(CH_2)_3Si(OC_2H_5)_3$(0.3 wt %)
@@: $CH_2=C(CH_3)COO(CH_2)_3Si(OCH_3)_3$ (@@¹: 0.4 wt %, @@²: 0.2 wt %)

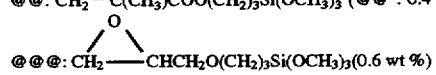

@@@: $CH_2\text{—}CHCH_2O(CH_2)_3Si(OCH_3)_3$ (0.6 wt %)

As can be seen from Table I, the films prepared by employing alumina and a silane coupling agent, and, optionally, spherical silica having a specified particle diameter in specified amounts in accordance with the present invention exhibit surface properties and transparency superior to those prepared without the coupling agent or that prepared by employing silica and a silane coupling agent as in the prior art; and, therefore, they are better suited for use in labels, glass protecting films, photoresists and the like.

While the invention has been described with respect to the specific embodiments, it should be recognized that various modifications and changes may be made by those skilled in the art to the invention which also fall within the scope of the invention as defined by the appended claims.

What is claimed is:

1. A biaxially oriented polyester film comprising 0.01 to 4 wt % of γ-, δ-, θ-alumina or a mixture thereof having an average particle diameter ranging from 0.005 to 3 μm and a Mohs hardness of 6 or more, and 0.05 to 5 wt %, based on the amount of alumina, of a silane coupling agent of formula (I):

$$R_1-R_2-Si-(OR_3)_3 \tag{I}$$

wherein, $R_1$ is a methacryl (—OCC(CH$_3$)=CH$_2$),
$$\overset{O}{\underset{\|}{}}$$

an acryl (—OCCH=CH$_2$),
$$\overset{O}{\underset{\|}{}}$$

a glycidyl(CH$_2$—CHCH$_2$O—)
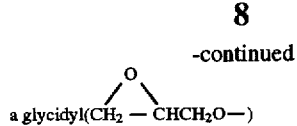

or an amino (—NR'$_2$) group with R' being a hydrogen or an alkyl radical;

$R_2$ is a $C_{1-5}$ alkylene group; and $R_3$ is a $C_{1-3}$ alkyl group.

2. The polyester film of claim 1, wherein the alumina has an average particle diameter ranging from 0.01 to 1.5 μm and is employed in an amount ranging from 0.05 to 2 wt %.

3. The polyester film of claim 1, wherein the silane coupling agent is selected from the group consisting of $H_2N(CH_2)_3Si(OC_2H_5)_3$, $CH_2=C(CH_3)COO(CH_2)_3Si(OCH_3)_3$ and CH$_2$—CHCH$_2$O(CH$_2$)$_3$Si(OCH$_3$)$_3$.
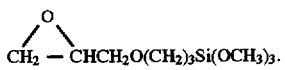

4. The film of claim 1, which further comprises 0.01 to 4 wt % of spherical silica particles having an average particle diameter ranging from 0.005 to 3 μm.

5. The film of claim 1, wherein the silane coupling agent is added, to a stirred ethylene glycol slurry containing alumina, in an amount ranging from 0.05 to 5 wt % based on the weight of the alumina employed, at a temperature ranging from 30° to 160° C., and the resulting mixture is maintained for a period ranging from 40 to 80 minutes.

* * * * *